(12) United States Patent
Sawada et al.

(10) Patent No.: US 6,765,318 B2
(45) Date of Patent: Jul. 20, 2004

(54) LINEAR DRIVING DEVICE

(75) Inventors: Kiyoshi Sawada, Shizuoka (JP); Tomohiko Kawai, Yamanashi (JP); Kenzo Ebihara, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 17 days.

(21) Appl. No.: 10/098,462

(22) Filed: Mar. 18, 2002

(65) Prior Publication Data

US 2002/0135240 A1 Sep. 26, 2002

(30) Foreign Application Priority Data

Mar. 26, 2001 (JP) ........................................ 2001-087256

(51) Int. Cl.$^7$ .......................... H02K 41/00; H02K 33/16
(52) U.S. Cl. ...................................................... 310/12
(58) Field of Search ............................. 310/12, 13, 14, 310/15, 17

(56) References Cited

U.S. PATENT DOCUMENTS

| | | | | | |
|---|---|---|---|---|---|
| 4,509,006 | A | * | 4/1985 | Pinson | ........................... 322/4 |
| 5,317,221 | A | * | 5/1994 | Kubo et al. | ................... 310/12 |
| 5,504,407 | A | * | 4/1996 | Wakui et al. | .......... 318/568.17 |
| 6,155,721 | A | * | 12/2000 | Kurosawa et al. | .......... 384/100 |
| 6,193,199 | B1 | * | 2/2001 | Karam, II | ................. 248/276.1 |
| 6,256,885 | B1 | * | 7/2001 | Takeuchi et al. | .......... 29/898.02 |
| 6,285,097 | B1 | * | 9/2001 | Hazelton et al. | ............... 310/12 |
| 6,330,837 | B1 | * | 12/2001 | Charles et al. | ........... 74/490.06 |
| 6,449,030 | B1 | * | 9/2002 | Kwan | .......................... 355/72 |

FOREIGN PATENT DOCUMENTS

| | | |
|---|---|---|
| JP | 59-63973 | 4/1984 |
| JP | 04-63333 | 5/1992 |
| JP | 11-150849 | 6/1999 |
| WO | WO 99/48191 | 9/1999 |

* cited by examiner

*Primary Examiner*—Thanh Lam
*Assistant Examiner*—Judson H. Jones
(74) *Attorney, Agent, or Firm*—Staas & Halsey LLP

(57) ABSTRACT

A linear driving device of compact size capable of fundamentally canceling a reactive force produced in acceleration and deceleration of a slider within the linear driving device. A slider and a stator constitute a linear motor. The stator is supported to move linearly on the base by an air bearing and the slider is supported to move linearly on the stator. When the slider is driven by the stator to move in one axial direction, a reactive force is exerted on the stator in an opposite axial direction to move the stator in the opposite direction, so that substantially no force is transmitted from the stator to the base. A ratio of weights of the stator and the slider is lopsided so that motion strokes of these members are different. Since the reactive force produced in acceleration and deceleration is canceled within the linear driving device and is not transmitted to the base, any undesirable effect is caused outside of the linear driving device. This device can be applied to a machining tool or a measuring device to realize a high-speed and high-precision machining or measurement.

34 Claims, 4 Drawing Sheets

LINEAR DRIVING DEVICE

BACKGROUND OF THE INVENTION

1. Field of the Invention

The present invention relates to a linear driving device for a high-speed and high-precision motion.

2. Description of the Related Art

In recent machines and devices such as machining tools, measuring devices, etc., a linear driving device using a linear motor or a voice coil motor is widely used to meet requirements of high speed and high-precision. This linear driving device comprises a slider as a movable member and a base as a stationary member. When the slider as the movable member is accelerated, a reactive force of the acceleration force is exerted on the base in a direction opposite to the direction of acceleration of the slider. In performing a high-speed motion of the linear driving device, a large acceleration can be produced for the high-speed motion by simply increasing a driving power, but the reactive force exerted on the base increases with the increase of the acceleration of the slider. In the machine requiring a precise motion, a temporary distortion or inclination of the machine influenced by the reactive force is not negligible even if it is of a slight amount. It is possible to reduce the influence of the reactive force by enhancing rigidity of the machine, but the machine is made large and heavy. If the slider is designed to be small and light in order to reduce the reactive force, a purpose of the linear driving device is restricted. Further, in the case where the slider is driven to reciprocate at high speed, the slider functions as a vibrator to vibrate the linear driving device, so that a damping device for reducing the vibration is needed. In this case, the vibration caused by the slider reciprocating at a constant cycle can be reduced by a simple damping device. However, it is necessary to drive the slider to reciprocate at different cycles for different purposes of the device, so that an active control of the damping device is needed, to make the device complicated and costly. Anyway, since it is not possible for these techniques to completely eliminate the reactive force and thus the vibration, it is hardly possible not to transmit the vibration to members outside of the linear driving device. Thus, it is desirable to realize a linear driving device capable of canceling the reactive force and thus the vibration within the linear driving device.

There have been proposed a linear driving device having a function of canceling the reactive force using two sliders to move in opposite directions so as to cancel the reactive force with the driving force. In this linear driving device, however, only one of the two sliders is used for driving an object and the other of the sliders is not used for driving an object since a purpose of the linear driving device for machining or measurement using both of the sliders is greatly restricted. Further, a size of the linear driving device is rendered substantially twice as large as the conventional linear driving device and thus it is difficult to make the device compact.

SUMMARY OF THE INVENTION

An object of the present invention is to provide a compact linear driving device capable of fundamentally canceling a reactive force produced in acceleration and deceleration of a slider within the linear driving device.

A linear driving device of the present invention comprises: a base; a driving member supported movably with respect to the base in opposite linear directions on the base; and a slider driven by the driving member and supported movably with respect to the driving member in the same opposite linear directions as the driving member. With this arrangement, a driving force and a reactive force thereof in acceleration and deceleration of the slider are canceled in pair within the linear driving device and no influence of these forces is exerted outside of the device.

The driving member may be supported on the base means of a hydraulic bearing, so that substantially no force is transmitted to the base. In this case, an exciting coil of the driving member may be coated with a resin layer so that a surface of the resin layer constitutes a bearing surface of the hydraulic bearing.

Further, the slider may be supported on the driving member by means of a hydraulic bearing. In this case also, an exciting coil of said driving member is coated with a resin layer so that a surface of the resin layer constitutes a bearing surface of the hydraulic bearing.

The driving member and the slider may have different weights, so that they have different strokes of motion.

Weight distributions of the driving member and the slider may be set symmetrical with respect to an axis of motion of these members, so that any moment of rotating these elements is not produced in driving the slider.

Power cables for supplying an electric power to the driving member may be arranged between the base and the driving member to function as a spring for applying elastic force to the driving member in the direction of linear motion thereof, so as to eliminate deviation of positional relationship in linear motion of the driving member with respect to the base.

The driving member and the slider may constitute a linear motor.

DETAILED DESCRIPTION OF THE PREFERRED EMBODIMENTS

A linear driving device using a linear motor according to an embodiment of the present invention will be described.

Figure 1A:
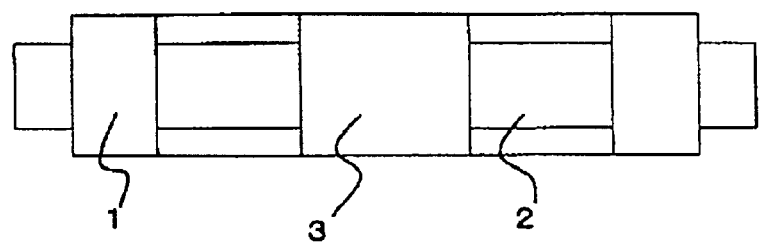
FIGS. 1a–1c are a plan view, an elevation view an a left side view, respectively, of a linear driving device according to an embodiment of the present invention.
Figures 1B, 1C:
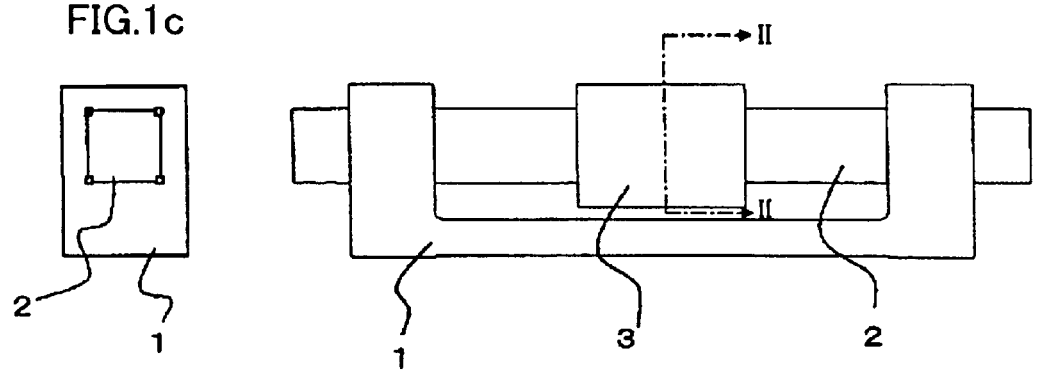

As shown in FIGS. 1a–1c, the linear driving device comprises three members of a base 1, a stator 2 including an exciting toil and a slider 3 including permanent magnets. A linear motor is constituted by the stator 2 as a driving member and the slider 3 as a movable member driven by the stator 2.

Figure 2:
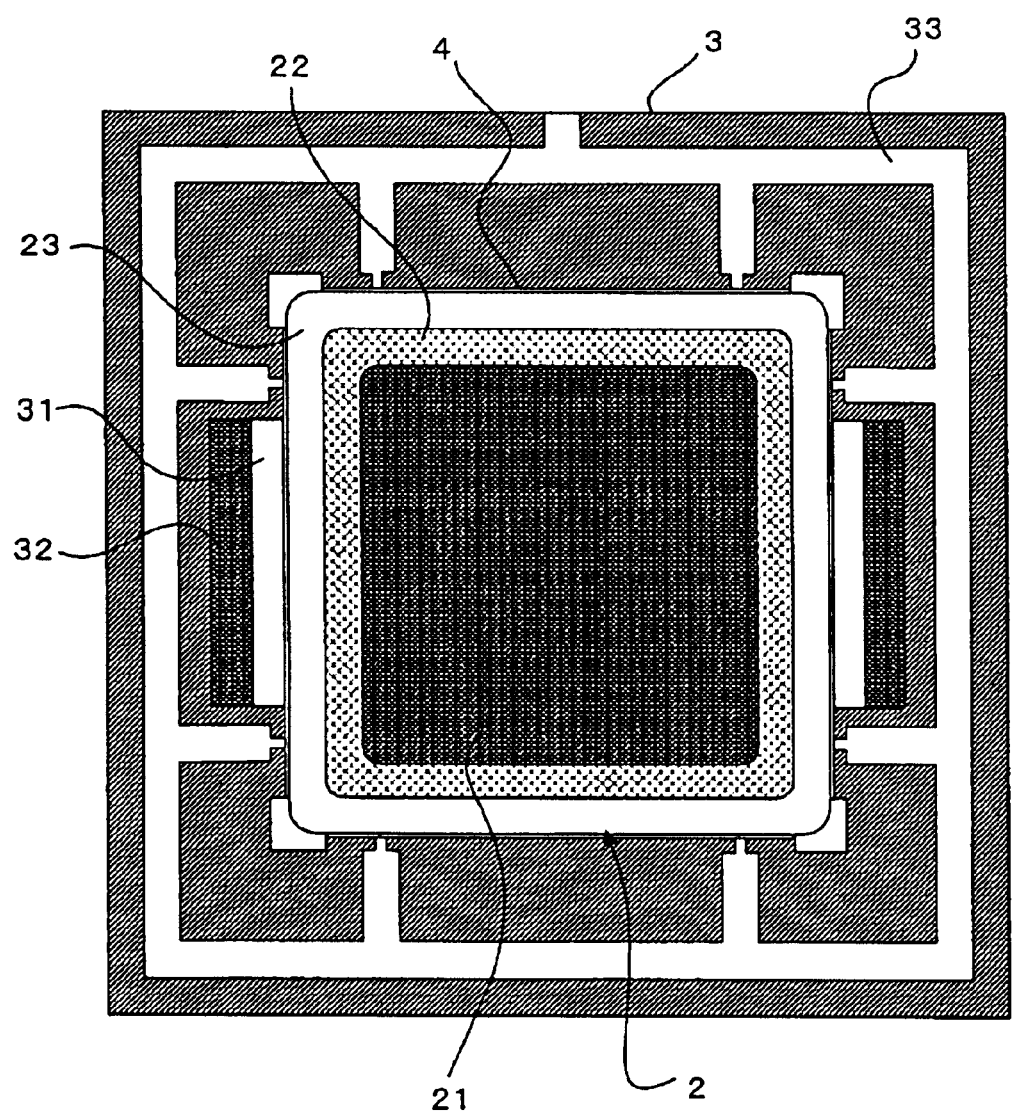
FIG. 2 is a cross-sectional view of the linear driving device along a line II—II in FIG. 1b.

In this embodiment, all of sliding faces of the base 1 and the stator 2 constitute air bearing surfaces of an air bearing so that the stator 2 is supported to move linearly only in axial opposite directions on the base 1 by the air bearing, in contrast to a conventional arrangement of a stator being fixedly mounted on the base. As shown in FIG. 2, all of sliding faces of the slider 3 and the stator 2 constitute air bearing surfaces 4 of an air bearing so that the slider 3 is supported on the stator 2 to move linearly only in the same axial opposite directions as the linear motion of the stator 2 by the air bearing. The stator 2 has a form of a rectangular rod as shown in FIG. 1c and 2 so that the stator 2 functions as a guide of the air bearing to restrict the motion of the slider 3 to the axial opposite directions in order to simplify the structure of the liner driving device. With the above arrangement, the stator 2 and the slider 3 are supported coaxially along an axis of linear motion thereof.

The stator 2 comprises a core 21 arranged at a central portion thereof and an exciting coil 22 wound on the core 21. The coil 22 is coated with a resin layer 23 by molding. The resin layer 23 has flat outer surfaces abraded to form the air bearing surfaces of the air bearing. The slider 3 has a rectangular through hole and permanent magnets 31 with associated magnetic cores 32 on inner opposite sides. Surfaces of the magnets 31 constitute the air bearing surfaces 4. In FIG. 2, an air-supplying path 33 for supplying pressurized air between the air bearing surfaces 4 is formed inside the slider 3.

The slider 3 is driven according to a principle of a known linear motor. In particular, the slider 3 is driven by an electromagnetic force generated by a magnetic field produced by electric current on the coil 22 and a magnetic field of the magnets 31. When the slider 3 is driven to accelerate in one axial direction, the stator is accelerated in the other opposite axial direction by the reactive force of the acceleration force. Also, when the slider 3 is driven to decelerate in one axial direction, the stator is decelerated in the other opposite axial direction by the reactive force of the deceleration force. In the acceleration and deceleration, the frictional resistance in the axial direction is substantially zero since the stator 2 is supported on the base by the air bearing, and therefore no force is transmitted from the moving stator 2 to the base 1.

Thus, a system of motion of the slider 3 and the stator 2 is closed. The internal forces interacting between the slider 3 and the stator 2 cancel in pair and do not contribute to the motion of the system as a whole. Ideally, no force is transmitted to outside of the system even if the slider 3 and the stator 2 are moved in high-speed. In the above arrangement, the stator 2 has to have a length of a sum of the stroke of the slider 3 and the stroke of the stator 2, the length of the stator is made greater than that of the conventional linear driving device.

However, since the driving force of driving the slider 3 and the reactive force exerted on the stator 2 are equal to each other and have opposite directions, respective strokes of motions of the slider 3 and the stator 2 are in inverse proportion to respective weights. In view of this relation, a ratio of weights of the slider 3 and the stator 2 is set so that the weight of the stator 2 is greater than the weight of the slider 3, to shorten the stroke and thus length of the stator 2.

Figure 4:
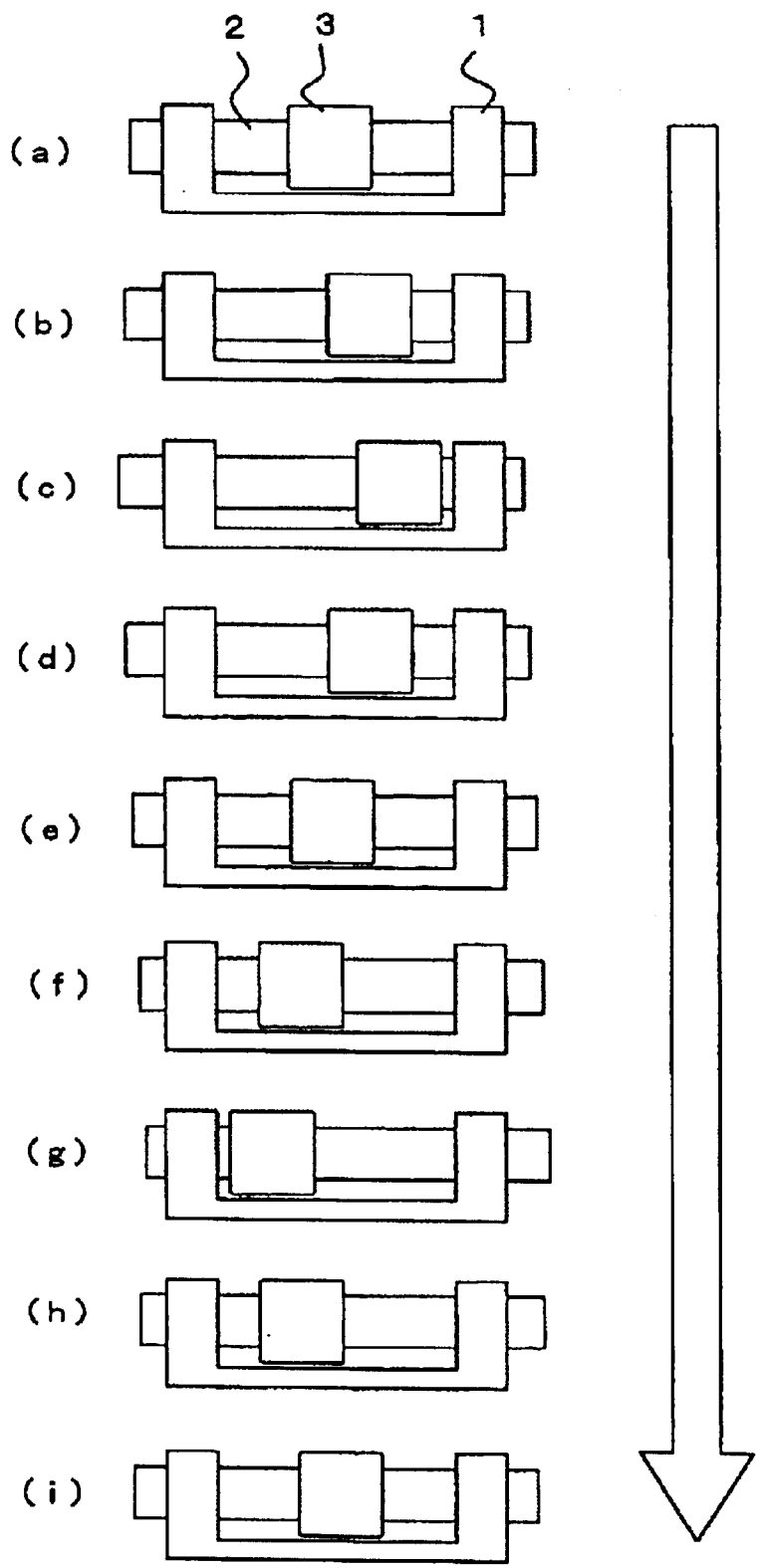
FIG. 4 is a schematic view of the linear driving device showing transition of positions of a slider and a stator in driving the slider to reciprocate in time series.

FIG. 4 shows transition of positions of the slider 3 and the stator 2 in time series while the slider 3 is driven to reciprocate. In this example, weight of the stator 2 is five-times greater than weight of the slider 3, i.e., a ratio of weight of the stator 2 to weight of the slider 3 is 5:1. In the state (a) in FIG. 4, the slider 3 is driven to move in the right-hand direction and reciprocates between a right-hand extreme position in the state (c) and a left-hand extreme position in the state (g). Comparing the state (a) where the slider 3 is at the central position and the state (c) where the slider 3 is at the right-hand extreme position, an amount of motion of the slider 3 in the right-hand direction is greater than an amount of motion of the stator 2 in the left-hand direction. Similarly, comparing the state (c) where the slider 3 is at the right-hand extreme position and the state (g) where the slider 3 is at the left-hand extreme position, an amount of motion of the slider 3 in the left-hand direction is greater than an amount of motion of the stator 2 in the right-hand direction, so that the stroke of the slider 3 is five-times greater than the stroke of the stator 2.

As described, the slider 3 and the stator 2 move in the same axial opposite directions and have different strokes. As long as the relation ship of the relative motions of the slider 3 and the stator 2 determined by the ratio of their weights is maintained, a center of gravity of a combination of these elements is not changed. Thus, no change of the center of gravity does not affect the linear driving device. Since the reactive force exerted on the stator 2 is not transmitted to the base 1 of the linear driving device and the center of gravity does not change with the motions of the slider 3 and the stator 2, the linear driving device with no reaction in high-speed motion is realized.

Figure 3:
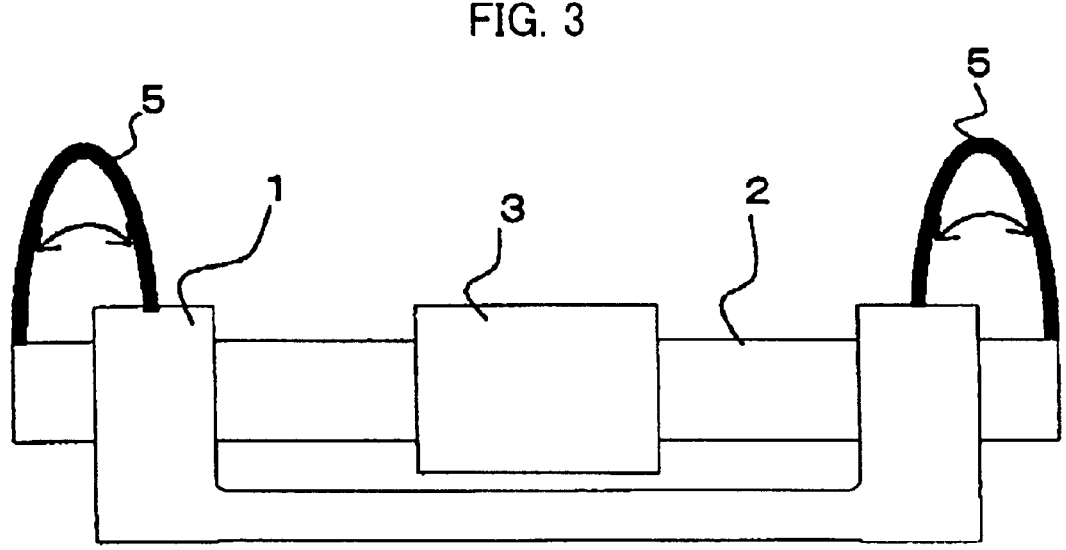
FIG. 3 is a schematic view of the linear driving device showing wiring of power cables of a stator.

Since the linear driving device is designed to be used for driving an object to be reciprocated at a high speed, the position of the slider 3 is not controlled but the speed of the slider 3 is controlled. As described, the relationship between the relative motions of the stator 2 and the slider 3 is not changed since they are determined by the ratio of weighs of the two members. The positional relationship in motion of the stator 2 with respect to the base 1 may be displaced slightly because of an air resistance and elastic force from power cables connected to the stator 2. As shown in FIG. 3, in order to prevent the displacement of positional relationship of the stator 2 and the base 1, the power cables 5 are arranged to be wired so that the stator 2 is returned to the centre position on the base 1 utilizing elasticity of the cables functioning as weak springs. Additional weak springs may be mounted on both ends of the stator 2 so that the stator 2 is urged to return to a predetermined position (central position). Further, in this embodiment, shapes of the stator 2 and the slider 3 are determined so that the weights of these members are distributed symmetrically with respect to a central axis thereof, as shown in FIG. 2, in order to prevent producing a moment to rotate the elements in acceleration and deceleration. If an object connected to an upper side of the slider 3 causes an unbalance of the combination of the slider 3 and the stator 2, a counterbalance may be added to adjust the balance.

In the foregoing embodiment, a linear motor is constituted by the stator 2 and the slider 3. Alternatively, a voice-coil motor may be constituted in the similar manner.

Further, in the foregoing embodiment, air bearings are used between the stator 2 and the base 1 and also between the stator 2 and the slider 3, hydraulic bearings such as oil bearings may be used therebetween. Furthermore, since the present invention is intended not to transmit any force produced in the linear driving device outside of the device by canceling in pair within the device, the bearing provided between the stator 2 and the slider 3 may be a bearing other than the hydraulic bearing in order to fulfill the object and effect of the present invention. The hydraulic bearing has to be provided at least between the stator and the base 1 not to transmit the forces produced in acceleration and deceleration of the slider 3 to the base 1.

According to the present invention, the reactive force produced in acceleration and deceleration of the slider, which has been a problem in a high-speed and high-precision linear driving device, is fundamentally canceled within the device, so that high-speed and precise measurement or machining is realized by employing the linear driving device of the present invention in a measuring device or a machining tool.

What is claimed is:

1. A linear driving device, comprising:

a base;

a driving member having an axis and being supported within said base to move in opposite linear directions on said base along said axis;

a single slider coaxial with, receiving therein, and being supported by said driving member, and a linear motor between the slider and the driving member to move said slider and said driving member in the same opposite linear directions.

2. A linear driving device according to claim 1, wherein said driving member is supported by a hydraulic bearing.

3. A linear driving device according to claim 2, wherein said driving member includes an exciting coil coated with a resin layer so that a surface of the resin layer constitutes a bearing surface of the hydraulic bearing.

4. A linear driving device according to claim 1, wherein said slider is supported by a hydraulic bearing.

5. A linear driving device according to claim 4, wherein said driving member includes an exciting coil coated with a resin layer so that a surface of the resin layer constitutes a bearing surface of the hydraulic bearing.

6. A linear driving device according to claim 1, wherein said driving member and said slider have different weights.

7. A linear driving device according to claim 1, wherein weight distributions of said driving member and said slider are symmetrical with respect to motion along the axis.

8. A linear driving device according to claim 1, wherein the driving member is a stator.

9. A linear driving device according to claim 1, wherein said driving member and said slider have different strokes of motion.

10. A linear driving device according to claim 1, wherein said driving member is a stator movably supported on the base by an air bearing therebetween.

11. A linear driving device according to claim 1, wherein the slider includes an air supply path extending from an exterior surface thereof to a space between the slider and the driving member.

12. A linear driving device according to claim 1, wherein surfaces of the driving member and the slider constitute air bearing surfaces.

13. A linear driving device according to claim 1, wherein the driving member is a stator including a central core, an exciting coil wound on the core, and a resin layer covering the coil, and the slider includes magnets on a surface facing the stator.

14. A linear driving device according to claim 13, wherein the magnets have surfaces constituting air bearing surfaces.

15. A linear driving device according to claim 1, wherein the center of gravity of a combination of the driving member and the slider does not change during the movement of the driving member and the slider.

16. A linear driving device as recited in claim 2, wherein the hydraulic bearing is an oil bearing.

17. A linear driving device according to claim 1, where said linear motor is a voice-coil motor.

18. A linear driving device as recited in claim 1, wherein a cross-section of the driving member is rectangular.

19. A linear driving device comprising:
a base;
a driving member having a axis and being supported within said base to move in opposite linear directions on said base along said axis;
a slider coaxial with, receiving therein, and being supported by said driving member, and
an electromagnetic linear motor between the driving member and the slider to move said slider and said driving member in the same opposite linear directions;
power cables for supplying an electric power to said electromagnetic linear motor, said power cables being arranged between said base and said driving member to function as a spring for producing elastic force to said driving member moving in the opposite linear directions.

20. A linear driving device according to claim 19, further comprising additional springs at opposite ends of the driving member to urge the driving member to a central position between the additional springs.

21. A linear driving device as recited in claim 19, wherein a cross-section of the driving member is rectangular.

22. A linear driving device, comprising:
a base;
a driving member supported movably with respect to said base in opposite linear directions on said base;
a slider driven by said driving member and supported movably with respect to said driving member in the same opposite linear directions as said driving member; and
a linear motor between the slider and the driving member to move said slider and said driving member in the same opposite directions,
wherein the driving member includes a stator and the slider is magnetized; and
power cables for supplying an electric power to said linear motor, said power cables being arranged between said base and said driving member to function as a spring for producing elastic force to said driving member in the direction of linear motion thereof.

23. A linear driving device according to claim 22, wherein said driving member is supported by a hydraulic bearing.

24. A linear driving device according to claim 23, wherein said driving member includes an exciting coil coated with a resin layer so that a surface of the resin layer constitutes a bearing surface of the hydraulic bearing.

25. A linear driving device according to claim 22, wherein said slider is supported by a hydraulic bearing.

26. A linear driving device according to claim 25, wherein said driving member includes an exciting coil coated with a resin layer so that a surface of the resin layer constitutes a bearing surface of the hydraulic bearing.

27. A linear driving device according to claim 22, wherein said driving member and said slider have different wights.

28. A linear driving device according to claim 22, wherein weight distributions of said driving member and said slider are symmetrical with respect to motion along the axis.

29. A linear driving device according to claim 22, wherein said driving member is supported by a bearing.

30. A linear driving device according to claim 29, wherein said driving member includes an exciting coil coated with a resin layer so that a surface of the resin layer constitutes a bearing surface of the bearing.

31. A linear driving device as recited in claim 22, wherein a cross-section of the driving member is rectangular.

32. A linear driving device, comprising:
a base;
a driving member having an axis and being supported within said base to move in opposite linear directions on said base along said axis;
a slider coaxial with, receiving therein, and being driven by said driving member and supported by said driving member; and
an electromagnetic linear motor between the driving member and the slider to move the slider and the driving member in the same opposite linear directions;
wherein the driving member is a stator,
wherein the slider is magnetized, and
wherein said stator has a weight greater than a weight of the slider, to allow a shorter stroke of motion for the stator relative to the slider.

33. A linear driving device according to claim 32, wherein a weight of the stator is five times greater than a weight of the slider, and the stroke of motion of the slider is five times greater than the stroke of the stator.

34. A linear driving device as recited in claim 32, wherein a cross-section of the driving member is rectangular.

* * * * *